(12) United States Patent
Jeon

(10) Patent No.: US 10,452,256 B2
(45) Date of Patent: Oct. 22, 2019

(54) NON-INTERFERING MULTI-APPLICATION DISPLAY METHOD AND AN ELECTRONIC DEVICE THEREOF

(71) Applicant: Samsung Electronics Co., Ltd., Gyeonggi-do (KR)

(72) Inventor: Yong-Joon Jeon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 309 days.

(21) Appl. No.: 14/899,922

(22) PCT Filed: Jul. 24, 2014

(86) PCT No.: PCT/KR2014/006730
§ 371 (c)(1),
(2) Date: Dec. 18, 2015

(87) PCT Pub. No.: WO2015/012607
PCT Pub. Date: Jan. 29, 2015

(65) Prior Publication Data
US 2016/0139765 A1 May 19, 2016

(30) Foreign Application Priority Data

Jul. 25, 2013 (KR) ........................ 10-2013-0087920

(51) Int. Cl.
*G06F 3/0488* (2013.01)
*G09G 5/14* (2006.01)
(Continued)

(52) U.S. Cl.
CPC .......... *G06F 3/0488* (2013.01); *G06F 3/0412* (2013.01); *G06F 3/0485* (2013.01);
(Continued)

(58) Field of Classification Search
CPC ................. G09G 5/14; G09G 2340/14; G09G 2340/145; G06F 9/4443; G06F 3/0412; G06F 2203/04803; G06F 3/048–04897
See application file for complete search history.

(56) References Cited

U.S. PATENT DOCUMENTS 5,959,626 A * 9/1999 Garrison ............... G06F 3/0482
715/784
6,271,852 B1 * 8/2001 Kamiyama ......... H01J 37/3026
250/492.22

(Continued)

FOREIGN PATENT DOCUMENTS

CN 101606124 A 12/2009
CN 103339593 A 10/2013
(Continued)

OTHER PUBLICATIONS

European Search Report dated Feb. 27, 2017.
(Continued)

*Primary Examiner* — Kieu D Vu
*Assistant Examiner* — Alvaro R Calderon, IV
(74) *Attorney, Agent, or Firm* — Cha & Reiter, LLC.

(57) ABSTRACT

An electronic device for outputting a screen and a method thereof are provided. The electronic device includes a display and a processor, wherein the processor outputs first and second execution screens by considering a shape of the second execution screen such that the first execution screen and the second execution screen do not overlap with each other.

11 Claims, 17 Drawing Sheets

(51) Int. Cl.
*G06F 3/041* (2006.01)
*G06F 3/0485* (2013.01)
*G06F 9/451* (2018.01)

(52) U.S. Cl.
CPC ...... *G06F 3/04855* (2013.01); *G06F 3/04883* (2013.01); *G06F 3/04886* (2013.01); *G06F 9/451* (2018.02); *G09G 5/14* (2013.01); *G06F 2203/04803* (2013.01); *G09G 2340/14* (2013.01); *G09G 2340/145* (2013.01)

(56) References Cited

U.S. PATENT DOCUMENTS

| | | | | |
|---|---|---|---|---|
| 6,760,048 | B1* | 7/2004 | Bates | G06F 3/0481 715/781 |
| 9,489,127 | B2* | 11/2016 | Kim | G06F 3/041 |
| 2005/0021336 | A1* | 1/2005 | Katsuranis | G06F 3/011 704/246 |
| 2005/0195221 | A1* | 9/2005 | Berger | G06F 3/0481 345/660 |
| 2006/0107204 | A1* | 5/2006 | Epstein | G06F 17/212 715/243 |
| 2006/0174212 | A1* | 8/2006 | Cok | G06F 3/04855 715/786 |
| 2006/0174214 | A1* | 8/2006 | McKee | G06F 3/0485 715/802 |
| 2006/0198555 | A1* | 9/2006 | Hosotsubo | G06T 11/60 382/162 |
| 2006/0277488 | A1* | 12/2006 | Cok | G06F 3/04855 715/784 |
| 2007/0183381 | A1 | 8/2007 | Seo et al. | |
| 2007/0229462 | A1* | 10/2007 | Huynh | A63F 13/10 345/169 |
| 2007/0229904 | A1* | 10/2007 | Mori | G06F 17/211 358/1.18 |
| 2008/0040683 | A1* | 2/2008 | Walsh | G06F 3/04855 715/786 |
| 2008/0244422 | A1* | 10/2008 | Hilgers | G06F 9/4443 715/763 |
| 2008/0256440 | A1* | 10/2008 | Boreham | G06F 17/211 715/247 |
| 2009/0150822 | A1* | 6/2009 | Miller | G06F 3/0485 715/784 |
| 2009/0210820 | A1* | 8/2009 | Adachi | G06F 3/0481 715/786 |
| 2009/0322690 | A1* | 12/2009 | Hiltunen | G06F 1/1649 345/173 |
| 2010/0083166 | A1* | 4/2010 | Happonen | G06F 3/0485 715/784 |
| 2010/0088592 | A1* | 4/2010 | Hosotsubo | G06F 17/217 715/255 |
| 2010/0088634 | A1 | 4/2010 | Tsuruta et al. | |
| 2010/0248788 | A1* | 9/2010 | Yook | G06F 3/0481 455/566 |
| 2011/0107272 | A1* | 5/2011 | Aguilar | G06F 3/04815 715/853 |
| 2011/0246917 | A1 | 10/2011 | Murakami et al. | |
| 2011/0302528 | A1* | 12/2011 | Starr | G06F 9/4443 715/800 |
| 2012/0162358 | A1 | 6/2012 | Choi | |
| 2012/0176322 | A1* | 7/2012 | Karmi | G06F 3/04883 345/173 |
| 2012/0289290 | A1 | 11/2012 | Chae et al. | |
| 2013/0055083 | A1* | 2/2013 | Fino | G06F 3/0485 715/716 |
| 2013/0120447 | A1* | 5/2013 | Kim | G06T 11/60 345/629 |
| 2014/0089833 | A1* | 3/2014 | Hwang | G06F 3/04817 715/769 |
| 2014/0181725 | A1* | 6/2014 | Yang | G06F 3/0481 715/777 |
| 2015/0095833 | A1* | 4/2015 | Kim | G06F 3/04886 715/773 |
| 2016/0041727 | A1* | 2/2016 | Choi | G06F 3/04842 715/835 |

FOREIGN PATENT DOCUMENTS

| | | |
|---|---|---|
| EP | 2 354 910 A1 | 8/2011 |
| KR | 10-2006-0101963 A | 9/2006 |
| KR | 10-2007-0107828 A | 11/2007 |
| KR | 10-2011-0082494 A | 7/2011 |
| KR | 10-2012-0067495 A | 6/2012 |
| KR | 10-2012-0089919 A | 8/2012 |

OTHER PUBLICATIONS

Australian Search Report dated Jul. 22, 2016.
Australian Notice of Acceptance dated Dec. 2, 2016.
Chinese Search Report dated Jan. 9, 2018.
European Search Report dated Feb. 19, 2019.

* cited by examiner

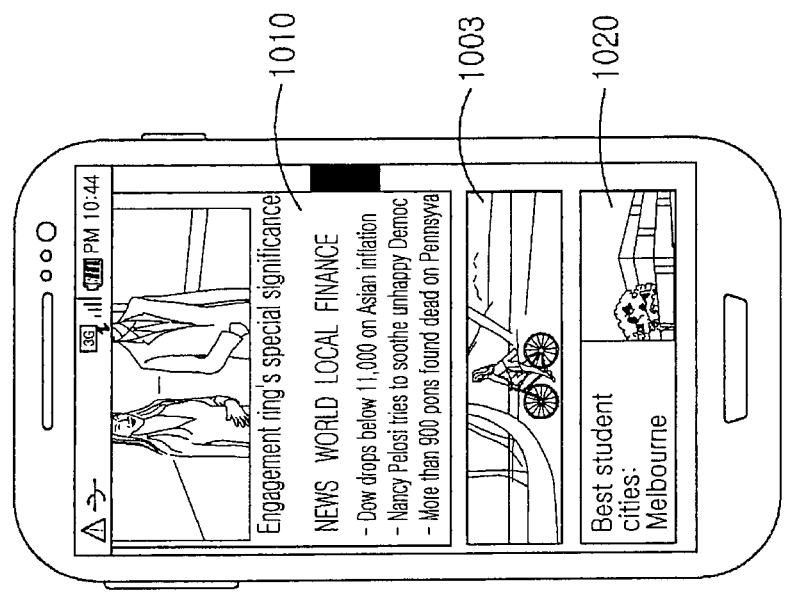
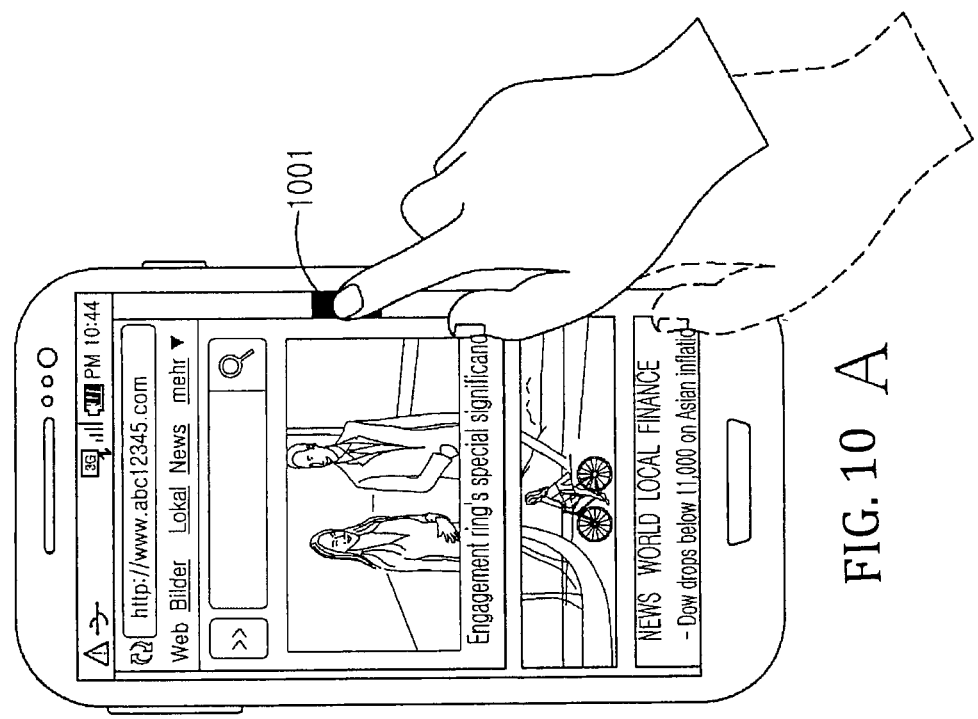
FIG. 10 A
FIG. 10 B

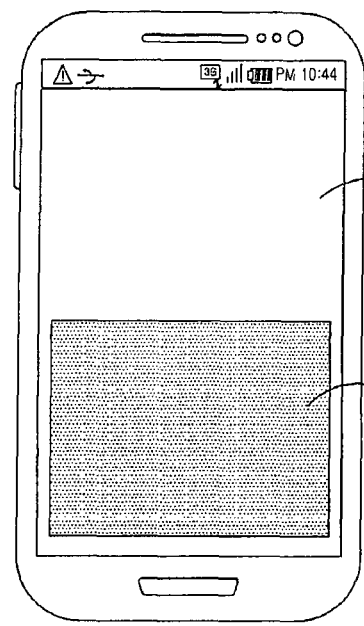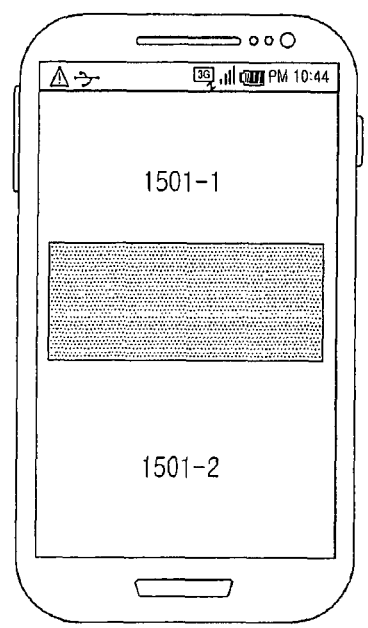
FIG. 15A　　　　　FIG. 15B
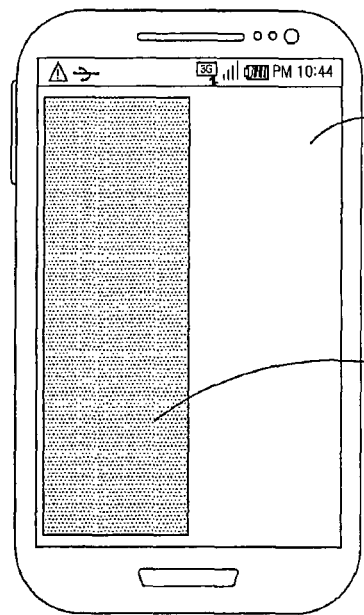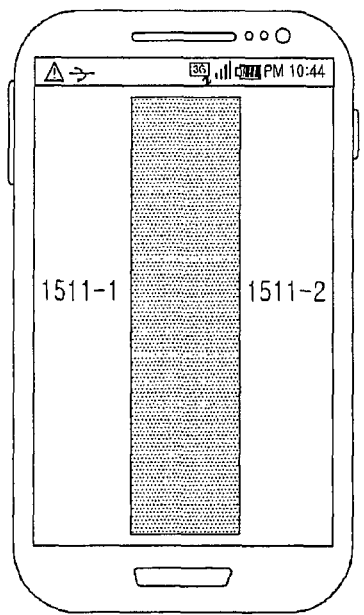
FIG. 15C　　　　　FIG. 15D

NON-INTERFERING MULTI-APPLICATION DISPLAY METHOD AND AN ELECTRONIC DEVICE THEREOF

CLAIM OF PRIORITY

This application is a National Phase Entry of PCT International Application No. PCT/KR2014/006730, which was filed on Jul. 24, 2014, and claims a priority to Korean Patent Application No. 10-2013-0087920, which was filed on Jul. 25, 2013, the contents of which are incorporated herein by reference.

BACKGROUND OF THE DISCLOSURE

1. Field of the Disclosure

Various embodiments of the present disclosure relates to a method for displaying and an electronic device thereof.

2. Description of the Related Art

With the rapid development of electronic devices in recent years, an electronic device capable of exchanging information or data is used in various manners. In general, the electronic device has a display means, and may output an operation of executing an application. For example, the electronic device may play back a digital content via the display means. For another example, the electronic device may output a web search screen using a browser via the display means.

An application execution screen (e.g., a browser screen, a content playback screen, a message writing screen, a schedule setting screen, etc.) may be output to a pre-defined area. For example, the electronic device may output the application execution screen by using an area called a window.

The electronic device may simultaneously output a plurality of application execution screens. For example, the electronic device may divide a display area so that a plurality of windows are placed to each divided area, or may output another window onto an output window in an overlapping manner.

SUMMARY

An aspect of the present disclosure is to solve at least the above-mentioned problems and/or disadvantages and to provide at least the advantages described below. Accordingly, an aspect of the present disclosure is to provide an apparatus and method for outputting a second execution screen without hiding a first execution screen in an electronic device.

Another aspect of the present disclosure is to provide an apparatus and method for changing a configuration of a first execution screen such that the first execution screen does not overlap with a second execution screen when the second execution screen is output in an electronic device.

Another aspect of the present disclosure is to provide an apparatus and method for outputting a second execution screen to a first execution screen of which a configuration is changed in an electronic device.

Another aspect of the present disclosure is to provide an apparatus and method for changing a configuration of a first execution screen according to a change in a location, size, shape, or direction of a second execution screen in an electronic device.

In accordance with an aspect of the present disclosure, an electronic device for outputting a screen is provided. The electronic device may include a display and a processor, wherein the processor outputs first and second execution screens by considering a shape of the second execution screen such that the first execution screen and the second execution screen do not overlap with each other.

In the aforementioned aspect of the present disclosure, the processor may separate the first execution screen and output the second execution screen between the separated first execution screens.

In addition, the processor may separate the first execution screen and output the screen to a plurality of areas of one window.

In addition, the processor may separate the first execution screen and output the screen to a plurality of windows.

In addition, the processor may change the first execution screen according to an input, and may output the screen such that the changed first execution screen does not overlap with the second execution screen.

In addition, if a size or location of the second execution screen is changed, the processor may change a shape of the first execution screen according to the changed second execution screen.

In addition, upon detection of a screen input for the first execution screen, the processor may scroll the screen together with the separated first execution screen according to the input.

In accordance with another aspect of the present disclosure, a method of outputting a screen of an electronic device is provided. The method may include confirming a shape of a second execution screen to be output in a state where a first execution screen is output, changing a configuration of the first execution screen such that the first execution screen and the second execution screen do not overlap with each other, on the basis of the shape of the second execution screen, and placing the second execution screen to the changed configuration of the first execution screen and outputting the screen together with the first execution screen.

In the aforementioned aspect of the present disclosure, the changing of the configuration of the first execution screen on the basis of the shape of the second execution screen further may include separating the first execution screen on the basis of a size or location of the second execution screen.

In addition, the method may further include changing at least one of a location, size, and direction of the second execution screen which is output to the changed configuration of the first execution screen according to an input, and changing the configuration of the first execution screen on the basis of the changed second execution screen.

In addition, the method may further include providing control in one screen together with the separated first execution screen according to an input.

In addition, the method may further include, if a third execution screen is output onto the second execution screen which is output to the changed configuration of the first execution screen, outputting the screen such that the second execution screen and the third execution screen do not overlap with each other.

In addition, the outputting of the screen such that the second execution screen and the third execution screen do not overlap with each other may include moving the second execution screen to a location not overlapping with the third execution screen or outputting the third execution screen to a location not overlapping with the second execution screen.

In addition, in the first execution screen having the changed configuration, an area other than an area to which the second execution screen is placed may consist of a plurality of windows.

In addition, the first execution screen having the changed configuration may consist of one window.

In accordance with another aspect of the present disclosure, there is provided a computer readable recording medium for storing a program to perform operations of confirming a shape of a second execution screen to be output in a state where a first execution screen is output, changing a configuration of the first execution screen such that the first execution screen and the second execution screen do not overlap with each other, on the basis of the shape of the second execution screen, and placing the second execution screen to the changed configuration of the first execution screen and outputting the screen together with the first execution screen.

BRIEF DESCRIPTION OF THE DRAWINGS

The above and other aspects, features and advantages of certain exemplary embodiments of the present disclosure will be more apparent from the following detailed description taken in conjunction with the accompanying drawings, in which:

FIGS. 10A and 10B illustrate a screen control operation of an electronic device according to various exemplary embodiments of the present disclosure;

FIGS. 15A, 15B, 15C and 15D illustrate a screen control operation of an electronic device according to various exemplary embodiments of the present disclosure;

DETAILED DESCRIPTION OF EXEMPLARY EMBODIMENTS

Figure 1:
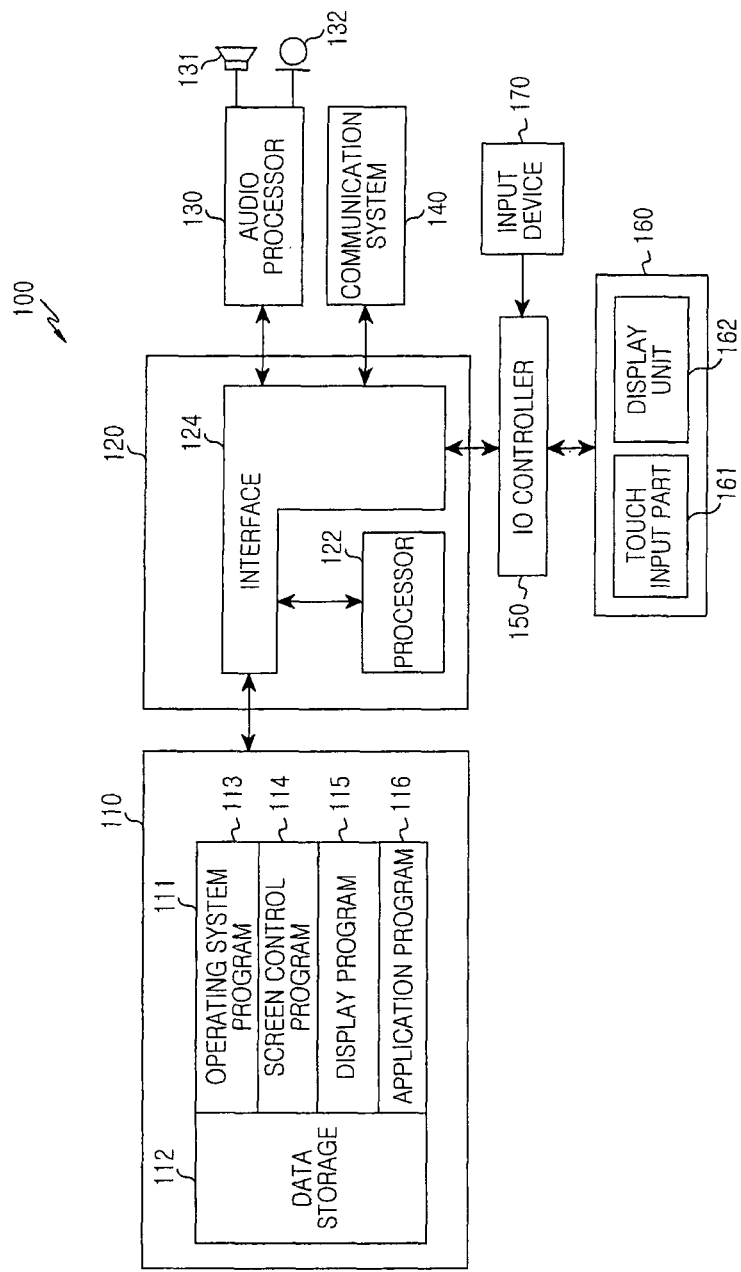
FIG. 1 is a block diagram illustrating a structure of an electronic device according to various exemplary embodiments of the present disclosure.

Hereinafter, the present disclosure is described with reference to the accompanying drawings. While the present disclosure is susceptible to various modifications and alternative forms, a specific embodiment thereof has been shown by way of example in the drawings and will herein be described in detail. It should be understood, however, that it is not intended to limit the disclosure to the particular form disclosed, but, on the contrary, the intention is to cover all modifications, equivalent, and alternatives falling within the spirit and scope of the present disclosure as defined by the appended claims. Like reference numerals denote like constitutional elements throughout the drawings.

A touch screen which is recently used in an electronic device in various manners can input and display information in one screen. The electronic device having the touch screen can output an application execution screen by using an input received by means of, for example, a finger, a stylus pen, an electronic pen, a voice command, or an extra sensor. For example, the electronic device may output a web screen, a content (e.g., image, video, e-book, etc.) playback screen, a game playback screen, a memo writing screen, a schedule setting screen, or the like, which is executed by the input.

The electronic device may output the application execution screen to an output area, e.g., an area called a window.

The electronic device may simultaneously output a plurality of execution screens. According to various exemplary embodiments, the electronic device may divide a display area so that the execution screen is output to each divided area, or may output another execution screen onto an output execution screen in an overlapping manner. According to one exemplary embodiment, the electronic device may output a popup screen onto a background screen, and the background screen and the popup screen may be defined as a first execution screen and a second execution screen.

If the second execution screen overlaps onto the first execution screen, the first execution screen may be hidden according to a size and shape of the second execution screen.

The electronic device according to the present disclosure may modify a configuration of the first execution screen so that the first execution screen is not hidden by the second execution screen. According to one exemplary embodiment, the electronic device may modify the configuration of the first execution screen by separating an output area of the first execution screen. According to one exemplary embodiment, the electronic device may generate an empty space, to which the second execution screen is to be output, in the separated output area of the first execution screen.

The electronic device according to the present disclosure may be a device having a communication function. For example, the electronic device may be one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, etc.), various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, etc.), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, etc. It is apparent to those ordinarily skilled in the art that the electronic device according to the various exemplary embodiments of the present disclosure is not limited to the aforementioned devices.

FIG. 1 is a block diagram illustrating a structure of an electronic device according to various exemplary embodiments of the present disclosure. Referring to FIG. 1, an electronic device 100 includes a memory 110, a processor unit 120, an audio processor 130, a communication system 140, an input/output control module 150, a touch screen 160, or an input unit 170. In this structure, at least one constitutional element may be plural in number. Each constitutional element is described as follows.

The memory 110 includes a program storage unit 111 for storing a program for controlling an operation of the electronic device 100 and a data storage unit 112 for storing data generated during the program is executed. For example, the data storage unit 112 may store a variety of rewritable data, such as phonebook entries, outgoing messages, incoming messages, etc., and may store execution screen information for an application executed in the electronic device 100. Herein, the execution screen information may include a location at which the execution screen is output, a size of the execution screen, a direction of the execution screen, a shape of a second execution screen, etc.

In addition, the program storage unit 111 may include an operating system program 113, a screen control program 114, a display program 115, or at least one application program 116. Herein, the program included in the program storage unit 111 is a set of instructions, and can be expressed as an instruction set.

The operating system program 113 includes various software components for controlling a general system operation. The control of the general system operation implies, for example, memory management and control, storage hardware (device) control and management, power control and management, etc. The operating system program 113 also performs a function of facilitating communication between various hardware (device) and program component (module).

The screen control program 114 may include several software constitutional elements to provide control such that the two execution screens do not overlap with each other if the first execution screen and the second execution screen are output simultaneously. The screen control program 114 may change the configuration of the first execution screen so that the first execution screen and the second execution screen do not overlap with each other. For example, the screen control program 114 may separate the first execution screen, and may output the second execution screen between the separated first execution screens. According to one exemplary embodiment, the electronic device may generate an empty space between the separated first execution screens and output the second execution screen on the empty space, so that the first executions screen is not hidden by the second execution screen. The screen control program 114 may apply a background theme, a background color, etc., to an area which is included in the first execution screen (e.g., the empty space generated by separating the first execution screen) and on which the second execution screen is to be output. For example, the screen control program 114 may output the empty space as one window by applying an effect such as a theme, a color, etc., to the empty space of the first execution screen.

The screen control program 114 may change the configuration of the first execution screen on the basis of a shape of the second execution screen which varies depending on an input. For example, the screen control program 114 may adjust a size, location, etc., of the area separated from the first execution screen according to the changed location, size, etc., of the second execution screen.

Upon detection of an input for scrolling the separated first execution screen, the screen control program 114 may scroll the first execution screen having the changed configuration by performing a single operation.

The display program 115 may include several software constitutional elements for providing and displaying graphics on the touch screen 160. The terminology of "graphics" indicates a text, a web page, an icon, a digital image, a video, an animation, etc.

The display program 115 may include several software constitutional elements related to a user interface.

The display program 115 may output the execution screen generated by the screen control program 114. The display program 115 may output the first execution screen and the second execution screen without overlapping with each other, and may output a screen controlled by an input. For example, the display program 115 may add the second execution screen to the changed configuration of the first execution screen and thus may output two non-overlapping screens. For another example, the display program 115 may output an operation of changing a size or location of the second execution screen which is output to the changed configuration of the first execution screen.

The application program 116 may include a software constitutional element for at least one application program installed in the electronic device 100. As described above, a program for outputting the first execution screen and the second execution screen without overlapping with each other may be included in the application program 116. This means that a function for preventing the content of the first execution screen from being hidden by the second execution screen may be provided by one application.

The processor unit 120 may include at least one processor 122 and an interface 124. Herein, the processor 122 and the interface 124 may be integrated as at least one integrated circuit or may be implemented as separate components.

The interface 124 may take a role of a memory interface for controlling an access of the processor 122 and the memory 110. The interface 124 may take a role of a peripheral device interface for controlling a connection of the processor 122 and an input/output peripheral device of the electronic device 100.

The processor 122 may control the electronic device 100 to output the first execution screen and the second execution screen without overlapping with each other by using at least one software program. In this case, the processor 122 may provide control to perform a function corresponding to a corresponding program by executing at least one program stored in the memory 110.

The audio processor 130 may provide an audio interface between the user and the electronic device 100 via a speaker 131 and a microphone 132.

The communication system 140 performs a communication function for voice communication and data communication of the electronic device 100. In this case, the communication system 140 may be divided into a plurality of communication sub-modules for supporting different communication networks. For example, although not limited thereto, the communication network may include a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC), etc., and may transmit and receive a content to be shared with another electronic device and object information for an object added to the content.

The input/output controller 150 may provide an interface between an input/output device (e.g., the touch screen 160, the input unit 170, etc.) and the interface 124.

The touch screen 160 is an input/output device for performing information input and information output, and may include a touch input unit 161 and a display unit 162.

The touch input unit 161 may provide touch information detected by using a touch panel to the processor unit 120 via the input/output controller 150. In this case, the touch input unit 161 provides the touch information to the processor unit 120 by changing the information in an instruction format such as touch_down, touch_move, and touch_up. The touch input unit 161 may generate input data for outputting the first execution screen or the second execution screen and input data for controlling the output second execution screen.

The display unit 162 may display status information of the electronic device 100, a character input by the user, a moving picture, a still picture, etc. For example, the display unit 162 may output the first and second execution screens which do not overlap with each other, and may output a screen controlled by an input. For example, the display unit 162 may add the second execution screen to the changed configuration of the first execution screen and thus may output two non-overlapping screens. For another example, the display unit 162 may output an operation of changing a size or location of the second execution screen which is output to the changed configuration of the first execution screen.

The input unit 170 may provide input data generated by a selection of the user to the processor unit 120 via the input/output controller 150. For example, the input unit 170 may include only control buttons for the control of the electronic device 100. For another example, the input unit 170 may consist of a key pad for receiving input data from the user, and may generate input data for outputting the first execution screen or the second execution screen and input data for controlling the output second execution screen.

Although not shown, the electronic device 100 may further include constitutional elements for providing an additional function such as a broadcast receiving module for broadcast reception, a digital sound source reproducing module such as an MP3 module, a near field communication module for near field communication, a proximity sensor for proximity sensing, etc., and a software element for operating the components.

Figure 2:
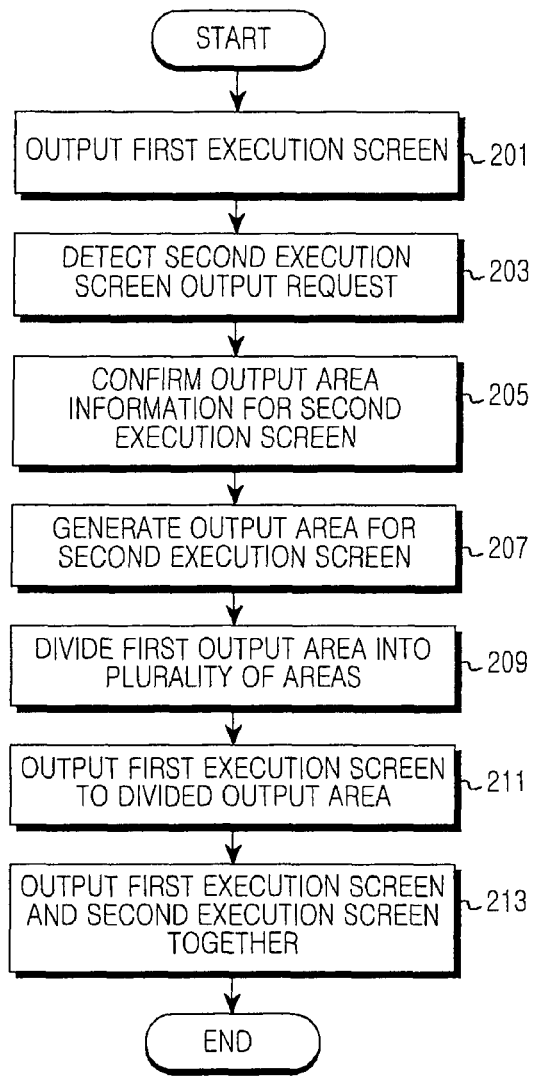
FIG. 2 is a flowchart illustrating a screen output operation of an electronic device according to various exemplary embodiments of the present disclosure.

FIG. 2 is a flowchart illustrating a screen output operation of an electronic device according to various exemplary embodiments of the present disclosure.

Referring to FIG. 2, the electronic device may output an execution screen for an application in step 201.

The electronic device may output the execution screen by outputting an output area in all or some portions of a display area. The output area in which the execution screen is output may be an area called a window. The electronic device may output a first execution screen via a first output area.

In step 203, the electronic device may detect a request for outputting an execution screen for a second application. Herein, the execution screen for the second application may be defined as a second execution screen. The electronic device may detect an input generated by using an input means such as a finger, an electronic pen, etc., a voice command input, a hardware key input, etc. For example, the electronic device may detect a request for dividing the display area, e.g., a request for dividing the display area into a left area and a right area to output the first execution screen and the second execution screen to respective divided areas. For another example, the electronic device may detect a request for outputting some or all portions of the second execution screen to the first execution screen in an overlapping manner.

In step 205, the electronic device may confirm information of an output area (e.g., a second window) to which the second execution screen is output. Herein, the information of the output area may include a location at which the second execution screen is output, a size of the second execution screen, a direction of the second execution screen, a shape of the second execution screen, etc. The information of the output area may be defined according to an application to be executed. For example, when the application execution ends, the electronic device may store information of an output area which is output before the end of the application execution, and may be used as output area information for the executed application.

In step 207, the electronic device may generate an output area to which the second execution screen is output on the basis of the output area information. For example, the electronic device may generate a second output area (e.g., a second window) for the second execution screen on the basis of a pre-defined size, location, or shape.

In step 209, the electronic device may divide or separate the first execution screen into a plurality of areas. The electronic device may generate an empty space, to which the second output area is to be output, in the first output area so that the first execution screen is not hidden by the overlapping of the second execution screen. For example, if the second execution screen is placed onto the first execution screen, the electronic device may generate an empty space, which corresponds to a height of the second output area with respect to the second execution screen, in some portions of the first output area.

The electronic device may apply an effect such as a theme, a color, etc., to an area (i.e., an empty space) to which the second execution screen is output in the first execution screen. For example, the electronic device may apply the effect to the empty screen to which the second execution screen is output, so as to distinguish the second execution screen which is output to the first execution screen. For another example, the electronic device may apply the effect to the empty screen to which the second execution screen is output, so that the second execution screen is output as if it is one portion constituting the first execution screen.

In step 211, the electronic device may output the first execution screen to the first output area in which the empty space is generated. The electronic device may output the first execution screen to an area other than the empty space of the first output area. For example, if the empty space is generated at an intermediate location other than a boundary of the first output area, the electronic device may define an area from an upper end of the first output area to an upper end of the empty space as one output area, may divide the first execution screen to output some portions thereof. Further, the electronic device may output the remaining portions of the first execution screen by defining an area from a lower end of the empty space to a lower end of the first output area as one output area.

In step 213, the electronic device may output the first execution screen and the second execution screen together. For example, the electronic device may output the two screens together by placing the second output area to the empty space generated in the first output area.

The electronic device according to the present disclosure may separate the first execution screen and output the second execution screen to the separated area, so that the first execution screen is not hidden by the output of the second execution screen.

Figure 3:
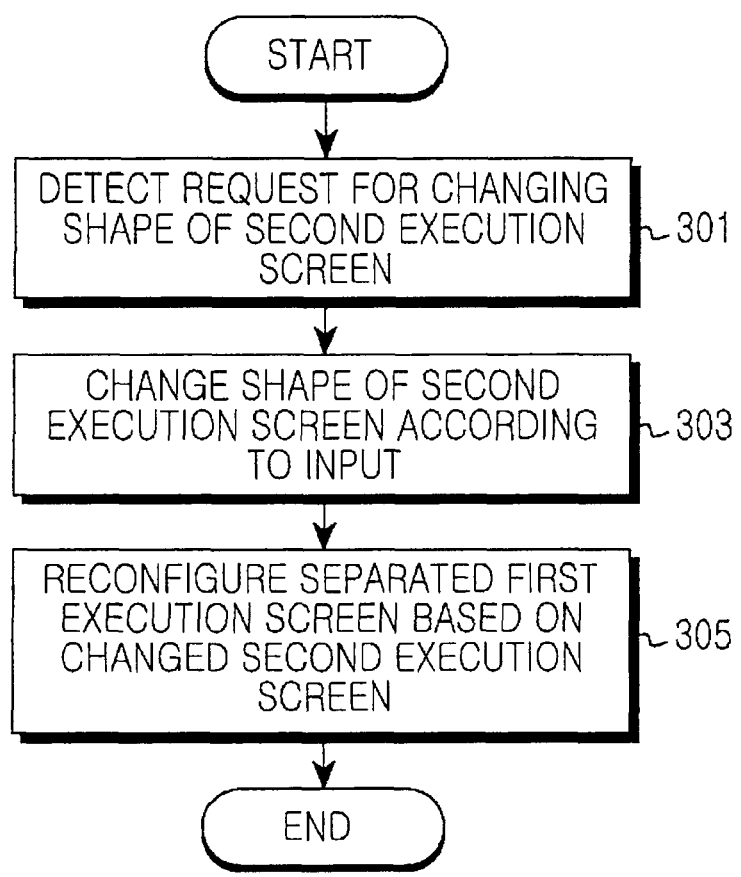
FIG. 3 is a flowchart illustrating an operation of changing a shape of an output area in another electronic device according to various exemplary embodiments of the present disclosure.

FIG. 3 is a flowchart illustrating an operation of changing a shape of an output area in another electronic device according to various exemplary embodiments of the present disclosure.

Referring to FIG. 3, in step 301, the electronic device may detect a request for changing a shape of a second execution screen. The electronic device may detect a user input for changing a location, size, shape, etc., of the second execution screen placed to an empty space of the first output area.

In step 303, the electronic device may change the shape of the second execution screen according to the input. For example, the electronic device may change the location, size, or shape of the previously output second execution screen according to the input.

In step 305, the electronic device may reconfigure a separated area of the first output area on the basis of the changed second execution screen. For example, the electronic device may adjust a size of each area separated from one output area on the basis of the changed size of the second execution screen. The electronic device may decrease a size of the separated area of the first output area when the size of the second execution screen is increased.

Figure 4:
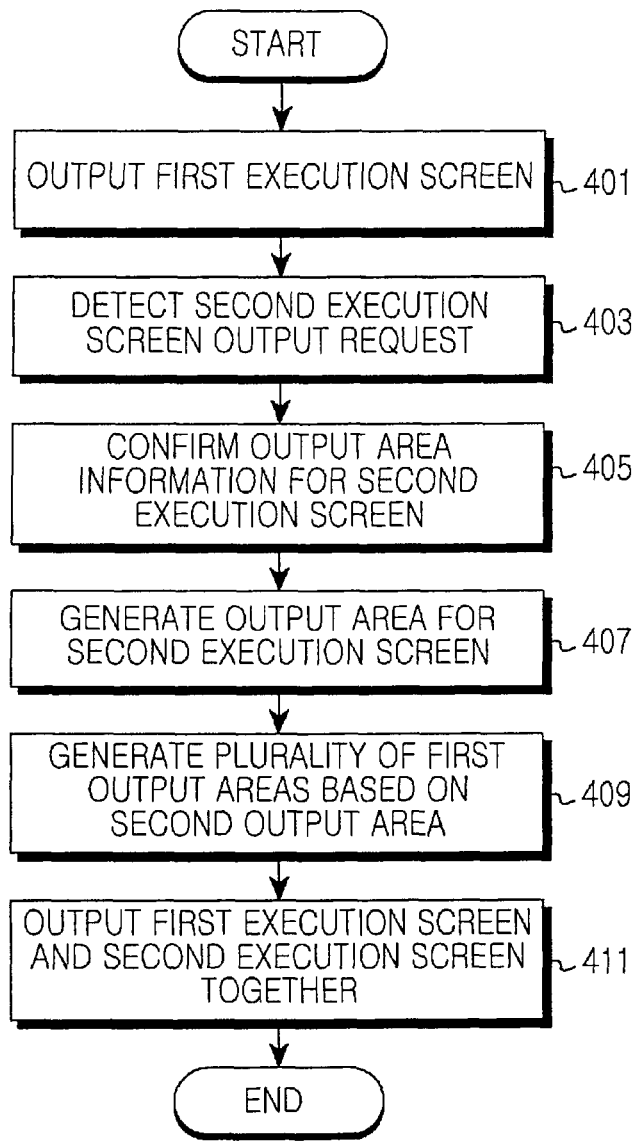
FIG. 4 is a flowchart illustrating a screen output operation of an electronic device according to various exemplary embodiments of the present disclosure.

FIG. 4 is a flowchart illustrating a screen output operation of an electronic device according to various exemplary embodiments of the present disclosure.

Referring to FIG. 4, the electronic device may output an execution screen for an application in step 401.

The electronic device may output the execution screen by outputting an output area in all or some portions of a display area. The output area in which the execution screen is output may be an area called a window. The electronic device may output a first execution screen via a first output area.

In step 403, the electronic device may detect a request for outputting an execution screen for a second application. Herein, the execution screen for the second application may be defined as a second execution screen. For example, the electronic device may detect a request for outputting some or all portions of the second execution screen to the first execution screen in an overlapping manner.

In step 405, the electronic device may confirm information of an output area (e.g., a second window) to which the second execution screen is output. Herein, the information of the output area may include a location at which the second execution screen is output, a size of the second execution screen, a direction of the second execution screen, a shape of the second execution screen, etc. The information of the output area may be defined according to an application to be executed. For example, when the application execution ends, the electronic device may store information of an output area which is output before the end of the application execution, and may be used as output area information for the executed application.

In step 407, the electronic device may generate an output area to which the second execution screen is output on the basis of the output area information. For example, the electronic device may generate a second output area (e.g., a second window) for the second execution screen on the basis of a pre-defined size, location, or shape.

In step 409, the electronic device may generate a plurality of first output areas on the basis of the second output area. The electronic device may generate the plurality of first output areas in the remaining areas other than the second execution area included in a display area. For example, if the second output area is placed to an intermediate location of the display area, the electronic device may output the first output area to an area from an upper end of the display area to an upper end of the second execution area, and may output a different first output area to a lower end of the second output area to a lower end of the display area.

In step 411, the electronic device may output the first execution screen and the second execution screen together. For example, the electronic device may divide the first execution screen and output it to the plurality of first output areas.

The electronic device may divide the first execution screen so that it is not hidden by the second execution screen and output it to each of the divided first output areas, and may output the second execution screen between the plurality of first output areas.

Figure 5:
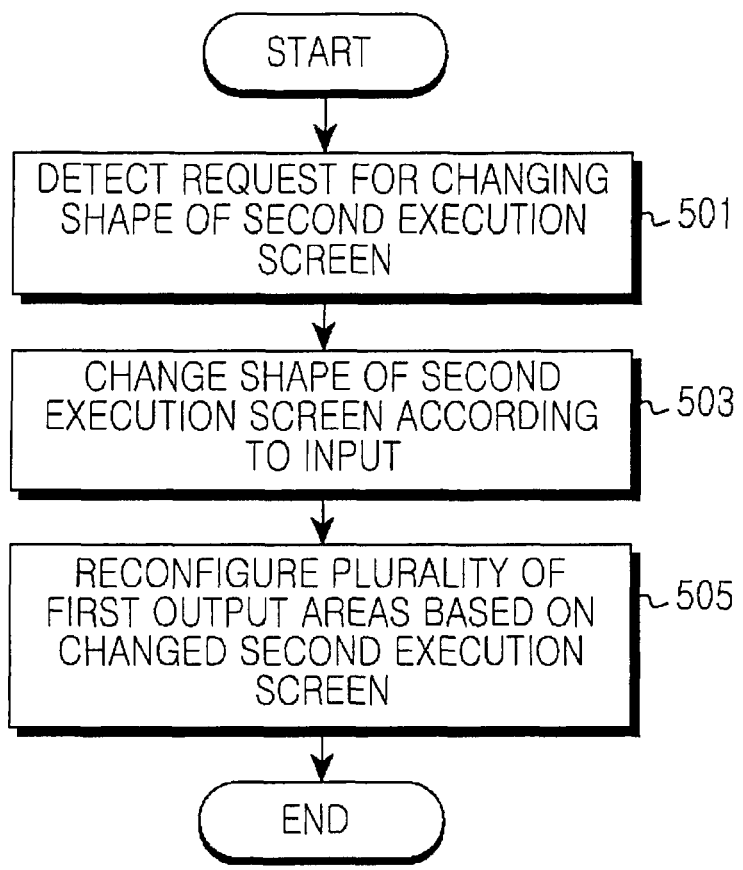
FIG. 5 is a flowchart illustrating an operation of changing a shape of an output area in an electronic device according to various exemplary embodiments of the present disclosure.

FIG. 5 is a flowchart illustrating an operation of changing a shape of an output area in an electronic device according to various exemplary embodiments of the present disclosure.

Referring to FIG. 5, in step 501, the electronic device may detect a request for changing a shape of a second execution screen. The electronic device may detect a user input for changing a location, size, shape, etc., of the second execution screen placed between a plurality of first output areas.

In step 503, the electronic device may change the shape of the second execution screen according to the input. For example, the electronic device may change the location, size, or shape of the second execution screen placed between the plurality of first output areas according to the input.

In step 505, the electronic device may reconfigure the plurality of first output areas on the basis of the changed second execution screen. For example, the electronic device may adjust a size of the plurality of first output areas neighboring to the second execution area on the basis of the changed size of the second execution screen.

Figure 6:
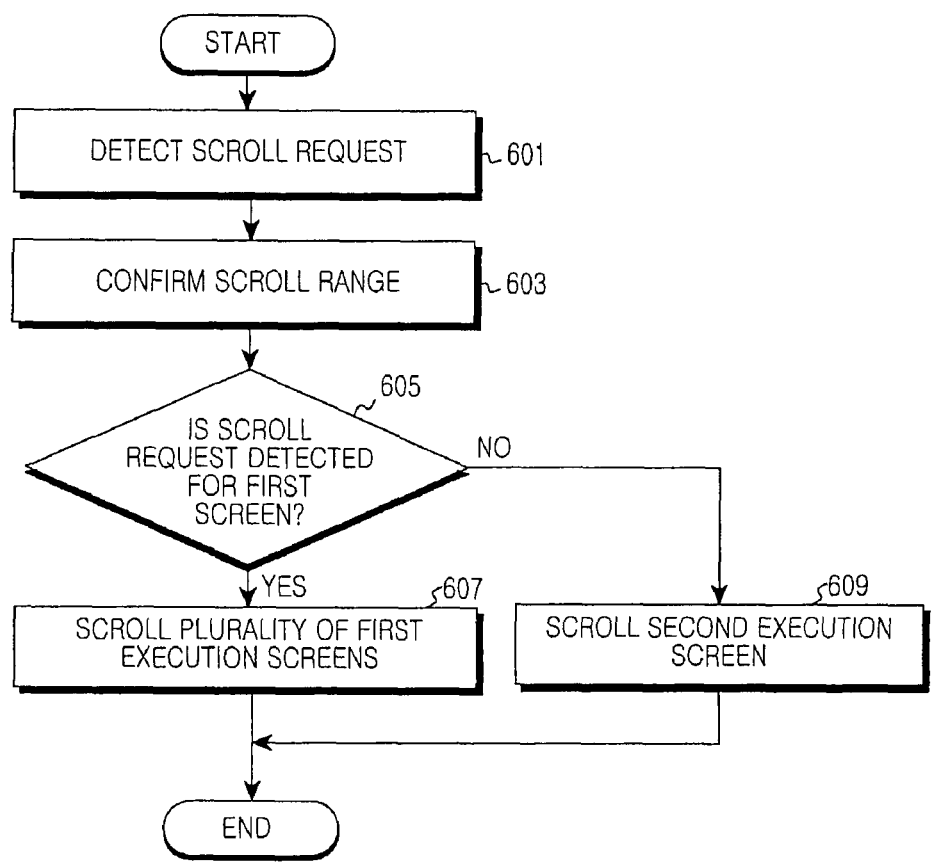
FIG. 6 is a flowchart illustrating a screen control operation of an electronic device according to various exemplary embodiments of the present disclosure.

FIG. 6 is a flowchart illustrating a screen control operation of an electronic device according to various exemplary embodiments of the present disclosure.

Referring to FIG. 6, the electronic device may output a first execution screen and a second execution screen. For example, the electronic device may place the second execution screen between the plurality of first execution screens. The electronic device may output the plurality of first execution screens by dividing one output area, and may output the plurality of first execution screens by using the plurality of output areas.

In step 601, the electronic device 100 may detect a scroll request for moving a content of the output screen.

In step 603, the electronic device may confirm a scroll range which is a range for moving the content of the output screen. For example, the electronic device may confirm the scroll range for moving the content of the output screen on a line basis or a page basis according to the input.

In step 605, the electronic device may confirm a screen for which the scroll request is detected. For example, the electronic device may confirm whether the detected scroll request is for the first execution screen or the second execution screen.

In step 607, if the scroll request is detected for the first execution screen, the electronic device may scroll the plurality of first execution screens on the basis of the scroll range. The electronic device may simultaneously scroll the first execution screens separated by the second execution screen according to a scroll operation.

The electronic device may detect the scroll request in a state where the plurality of first execution screens are output by dividing one output area, and may scroll only the plurality of first execution screens at the scroll request. The electronic device may scroll the divided first execution screen by performing a single operation in a state where the second execution screen is fixed. For example, the first execution screen is divided into upper and lower portions of the screen, and the second execution screen is placed between them. Upon detection of a scroll input for moving the first execution screen upwards, only a content of the lower first execution screen and the upper first execution screen is moved upwards. Instead of displaying the content of the lower first execution screen to the second execution screen, the electronic device may display the content by moving it to the upper first execution screen. The electronic device may scroll the upper first execution screen upwards by a range of moving the lower first execution screen to the second execution screen.

The electronic device may detect the scroll request in a state where the plurality of first execution screens are output by using a plurality of output areas, and may scroll only the plurality of first execution screens at the scroll request. The electronic device may perform the scroll operation for the plurality of output areas in which only the first execution screen is output in a state where the second execution screen is fixed.

In step 609, upon detection of the scroll request for the second execution screen, the electronic device may scroll the second execution screen on the basis of the scroll range.

Figure 7:
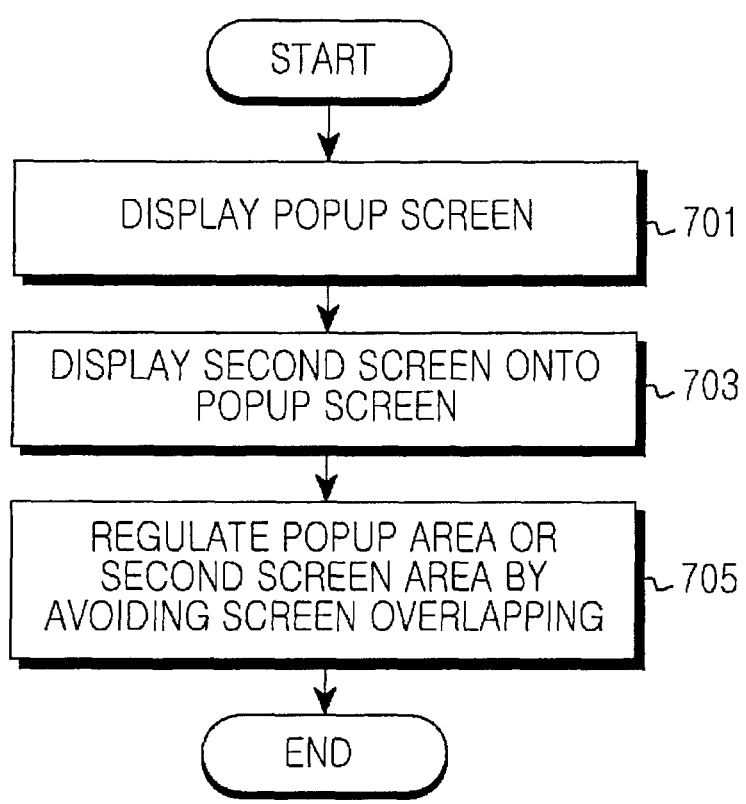
FIG. 7 is a flowchart illustrating a screen output operation of an electronic device according to various exemplary embodiments of the present disclosure.

FIG. 7 is a flowchart illustrating a screen output operation of an electronic device according to various exemplary embodiments of the present disclosure.

Referring to FIG. 7, the electronic device may output a second execution screen in step 701. The electronic device may output the second execution screen by changing a configuration of the first execution screen. For example, the electronic device may separate the first execution screen, and may output the second execution screen to the separated area of the first execution screen. The separated area of the first execution screen may be a window or an empty space generated by separating the first execution screen.

In step 703, the electronic device may output a third execution screen onto the second execution screen. Upon detection of an input, the electronic device may output an execution screen having another popup form to the second execution screen which is output in a popup form. For example, the electronic device may output the third execution screen corresponding to a virtual keyboard in a state where the second execution screen for a memo application is output.

In step 705, the electronic device may adjust a location of the second execution screen or the third execution screen so that the output second and third execution screens do not overlap. For example, the electronic device may move the previously output second execution screen to a location not overlapping with the third execution screen. For another example, the electronic device may move the newly output third execution screen to a location not overlapping with the previously output second execution screen.

Figure 8:
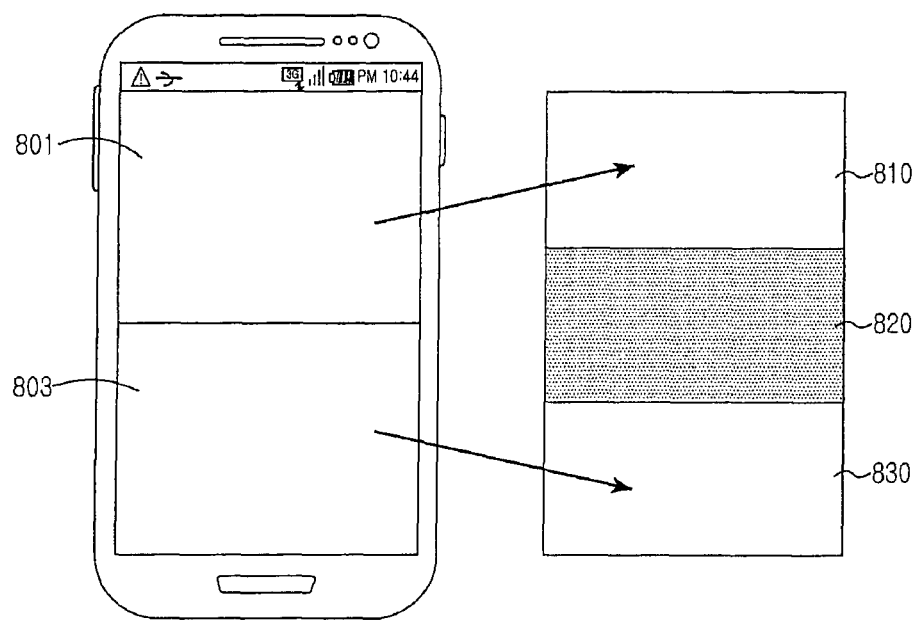
FIGS. 8A and 8B illustrate a screen of an electronic device according to various exemplary embodiments of the present disclosure.
Figure 8:
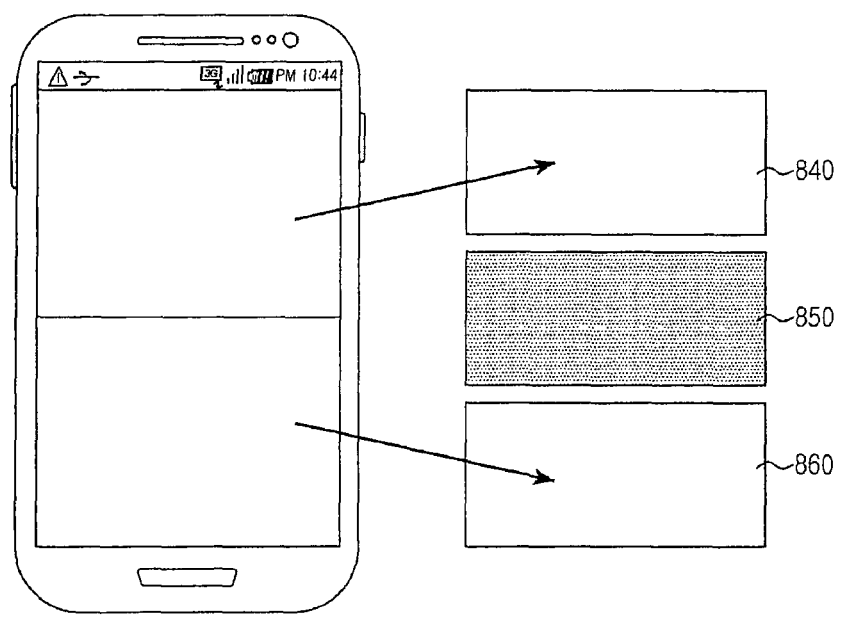

FIGS. 8A and 8B illustrate a screen of an electronic device according to various exemplary embodiments of the present disclosure.

Referring to FIGS. 8A and 8B, the electronic device may output a second execution screen in a state where a first execution screen is output. The electronic device may change a configuration of the first executions screen so that the first execution screen is not hidden by the second execution screen, and may add the second execution screen to the changed configuration and output it together with the first execution screen. For example, the electronic device may separate the first execution screen and output another execution screen between the separated execution screens.

Referring to FIG. 8A, the electronic device may divide a display area into a plurality of areas. The electronic device may output the first execution screen and the second execution screen to the divided areas.

For example, the electronic device may divide one output area corresponding to the display area into three areas 810, 820, and 830, and may use one of the areas as the empty space 820. As illustrated, the electronic device may use an intermediate area as the empty space, may output the second execution screen to the empty space, and may output first execution screens 801 and 803 to the remaining areas 810 and 830. The electronic device may divide the first execution screen and output it to a display area other than the empty space. The electronic device may separate one output area and divide it into three areas.

Referring to FIG. 8B, the electronic device may divide a display area into a plurality of areas. The electronic device may output the first execution screen and the second execution area to the divided areas.

For example, the electronic device may divide the display area into three areas and may use one of the areas as an empty space 850. The electronic device may generate output areas 840 and 860 to an area other than the empty space, may use an intermediate area as the empty space as illustrated, may output the second execution screen to the empty space, and may output the first execution screen to the output areas 840 and 860 which are output to the remaining areas. The electronic device may divide the first execution screen and may output the divided area to an output area which is output to an area other than the empty space.

Figure 9C:
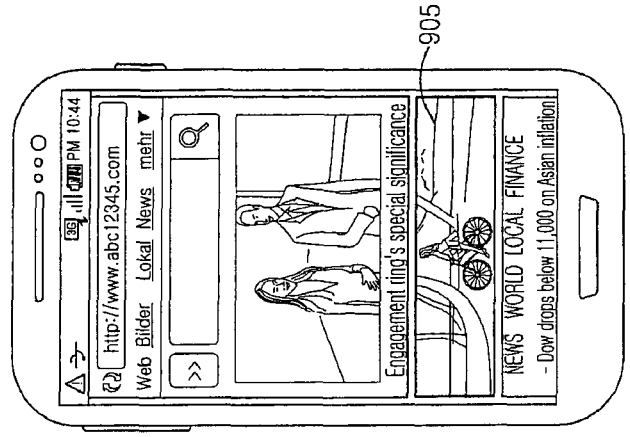
FIGS. 9A, 9B and 9C illustrate an operation of outputting an execution screen in an electronic device according to various exemplary embodiments of the present disclosure.
Figure 9B:
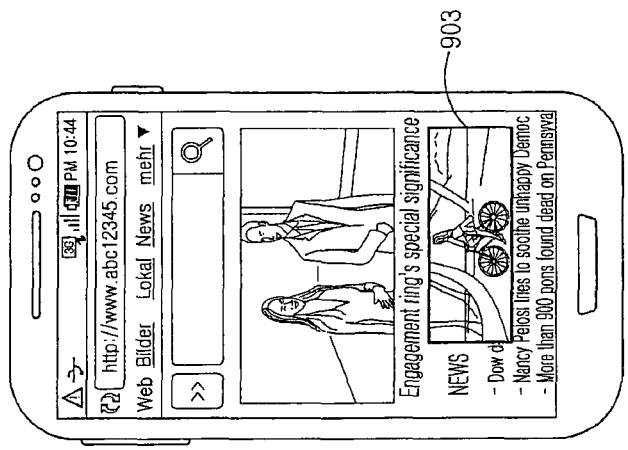
Figure 9A:
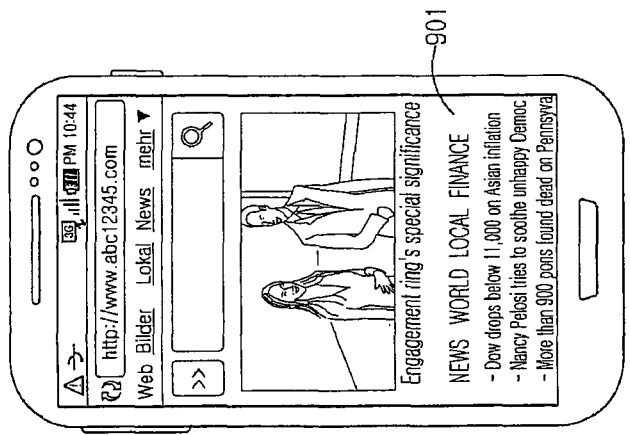

FIGS. 9A, 9B and 9C illustrate an operation of outputting an execution screen in an electronic device according to various exemplary embodiments of the present disclosure.

Referring to FIGS. 9A, 9B and 9C, the electronic device may output a web search screen to a first execution screen 910 as illustrated in FIG. 9A. For example, the electronic device may generate one output area and may output it to the first execution screen. The output area is an area to which the execution screen is output. The output area may be a window.

The electronic device may output a second execution screen 903 in a state where a first execution screen is output as illustrated in FIG. 9B. The electronic device may output a video playback screen in a state where the web search screen is output as illustrated. The electronic device may add an output area for outputting the second execution screen onto the output area of the first execution screen.

As illustrated, the second execution screen is an area overlapping onto the first execution screen. A content of the first executions screen may be partially hidden by the second execution screen.

As illustrated in FIG. 9C, the electronic device may output the first execution screen such that the first execution screen is not hidden by the second execution screen.

For example, the electronic device may separate the first execution screen, and may output the second execution screen between the separated first execution screens (see 905).

The electronic device may generate an empty space, to which the second execution screen is to be output, in an output area for the first execution screen. If the output area is separated by the empty space, the electronic device may divide the first execution screen and may output it to an area other than the empty space.

For another example, the electronic device may output the first execution screen by generating a plurality of output areas to a space other than a space to which the second execution screen is to be output.

The electronic device may generate an empty space, to which the second execution screen is to be output, in the output area for the first execution screen. If the output area is separated by the empty space, the electronic device may generate a plurality of output areas for outputting the first execution screen in the separated space, and may divide and output the first execution screen to the generated output area.

FIGS. 10A and 10B illustrate a screen control operation of an electronic device according to various exemplary embodiments of the present disclosure.

Referring to FIGS. 10A and 10B, the electronic device may output a second execution screen in a state where a first execution screen is output. The electronic device may output the screen such that a content of the first execution screen is not hidden by the second execution screen. For example, if a video playback screen is output onto a web search screen, the electronic device may separate the web search screen and may output the video playback screen between the separated screens.

Upon detection of an input 1001 for scrolling the first execution screen as illustrated in FIG. 10A, the electronic device may scroll a divided first execution screen by performing a single operation in a state where the second execution screen is fixed (see 1003) as illustrated in FIG. 10B.

For example, the first execution screen is divided into upper and lower portions of the screen, and the second execution screen is placed between them. Upon detection of a scroll input for moving the first execution screen upwards, only a content of the lower first execution screen 1020 and the upper first execution screen 1010 is moved upwards. Instead of displaying the content of the lower first execution screen to the second execution screen, the electronic device may display the content by moving it to the upper first execution screen. The electronic device may scroll the upper first execution screen upwards by a range of moving the lower first execution screen to the second execution screen.

For another example, the electronic device may detect the scroll request in a state where the plurality of first execution screens are output by using a plurality of output areas, and may scroll only the plurality of first execution screens at the scroll request. The electronic device may perform the scroll operation for the plurality of output areas in which only the first execution screen is output in a state where the second execution screen is fixed.

Figure 11A:
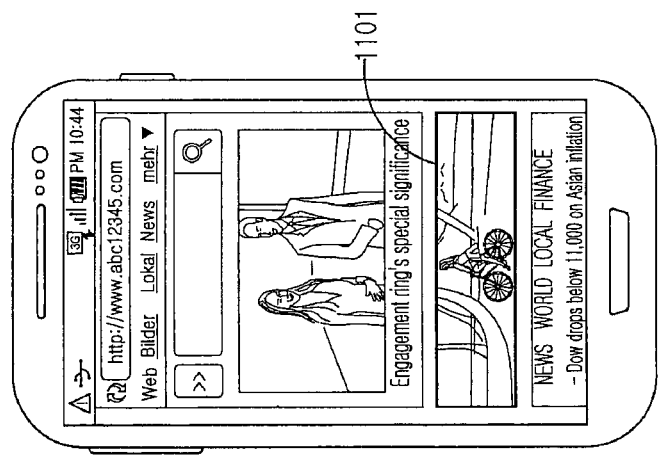
FIGS. 11A, 11B and 11C illustrate a screen control operation of an electronic device according to various exemplary embodiments of the present disclosure.
Figure 11B:
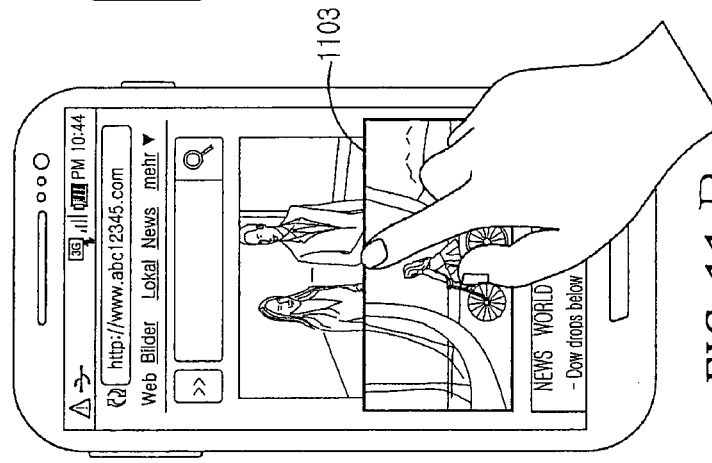
Figure 11C:
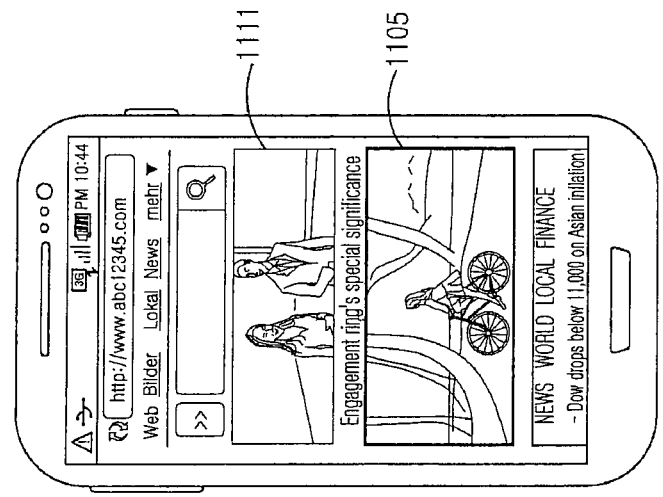

FIGS. 11A, 11B and 11C illustrate a screen control operation of an electronic device according to various exemplary embodiments of the present disclosure.

Referring to FIGS. 11A, 11B and 11C, the electronic device may output a second execution screen 1101 in a state where a first execution screen is output as illustrated in FIG. 11A. The electronic device may output the screen such that a content of the first execution screen is not hidden by the second execution screen. For example, if a video playback screen is output onto a web search screen, the electronic device may change a configuration of the web search screen so that the web search screen is not hidden by the video playback screen. For example, the electronic device may separate the web search screen so that the video playback screen does not overlap with the web search screen, and may output the video playback screen between the separated screens.

The electronic device may change the shape of the second execution screen by detecting an input. For example, the electronic device may detect a user input for changing a size of the second execution placed to an empty space generated by separating a first output area.

Upon detection of an input for adjusting a size of the second execution screen (see 1103) in a state where the first execution screen and the second execution screen are output as illustrated in FIG. 11B, the electronic device may change the size of the second execution screen to a size corresponding to the input (see 1005) as illustrated in FIG. 11C.

The electronic device may also adjust a size of the first execution screen according to the changed size of the second execution screen (see 1111). For example, since the size of the display area is limited, the electronic device may decrease the size of the first execution screen if the size of the second execution screen is increased.

Figures 12A, 12B, 12C:
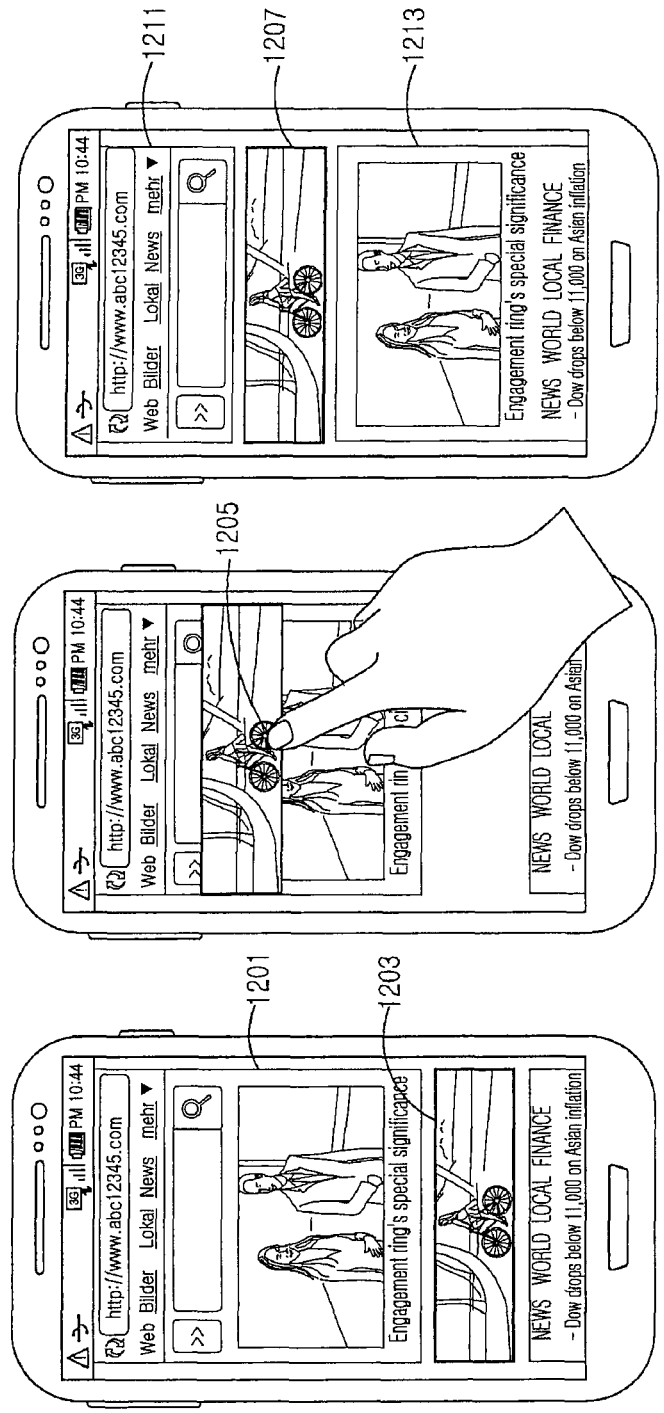
FIGS. 12A, 12B and 12C illustrate a screen control operation of an electronic device according to various exemplary embodiments of the present disclosure.

FIGS. 12A, 12B and 12C illustrate a screen control operation of an electronic device according to various exemplary embodiments of the present disclosure.

Referring to FIGS. 12A, 12B and 12C, the electronic device may output a second execution screen 1203 in a state where a first execution screen 1201 is output as illustrated in FIG. 12A. The electronic device may output the screen such that a content of the first execution screen is not hidden by the second execution screen. For example, if a video playback screen is output onto a web search screen, the electronic device may separate the web search screen and may output the video playback screen between the separated screens.

The electronic device may change the shape of the second execution screen by detecting an input. For example, the electronic device may detect a user input for changing a location of the second execution placed to an empty space generated by separating a first output area.

Upon detection of an input for adjusting a location of the second execution screen (see 1205) in a state where the first execution screen and the second execution screen are output as illustrated in FIG. 12B, the electronic device may change the location of the second execution screen to a size corresponding to the input (see 1207) as illustrated in FIG. 12C. The electronic device may adjust a shape of the first execution screen according to the changed location of the second execution screen (see 1211 and 1213). For example, since the size of the display area is limited, if the location of the second execution screen is changed, the electronic device may output the first execution screen to an area other than the changed location.

Figure 13:
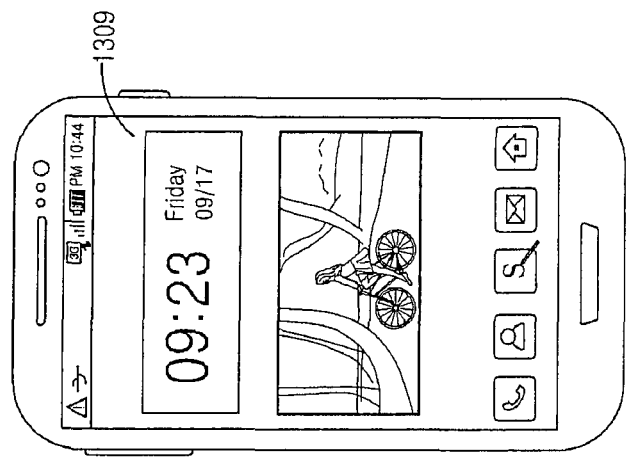
FIGS. 13A, 13B and 13C illustrate a screen control operation of an electronic device according to various exemplary embodiments of the present disclosure.
Figure 13:
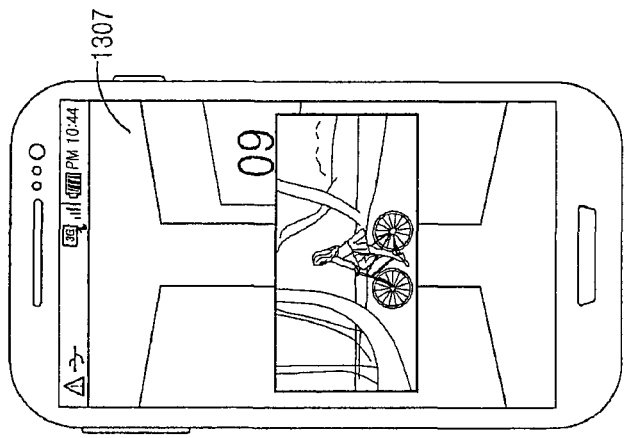
Figure 13:
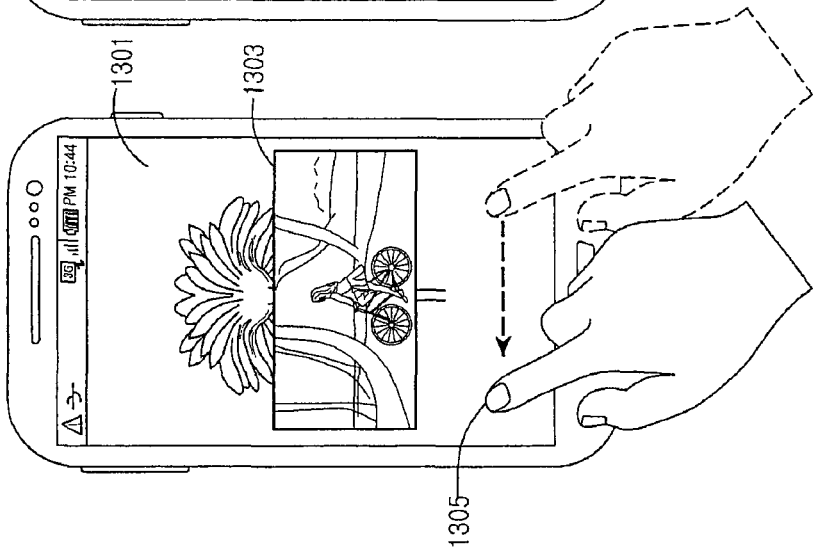

FIGS. 13A, 13B and 13C illustrate a screen control operation of an electronic device according to various exemplary embodiments of the present disclosure.

Referring to FIGS. 13A, 13B and 13C, the electronic device may output a second execution screen in a state where a first execution screen is output. The electronic device may output the screen such that a content of the first execution screen is not hidden by the second execution screen. For example, if a video playback screen is output onto an image playback screen, the electronic device may separate the image playback screen and may output the video playback screen between the separated screens.

The electronic device may change a shape of the first execution screen by detecting a user input. For example, the electronic device may detect a panning input for changing a first output area, and may detect a user input for changing a location of the second execution screen placed to an empty space.

Upon detection of an input for changing the first execution screen (see 1305) in a state where a first execution screen 1301 and a second execution screen 1303 are output as illustrated in FIG. 13A, the electronic device may output the first execution screen by changing the first execution screen corresponding to the input in a state where the second execution screen is fixed (see 1307) as illustrated in FIG. 13B.

The electronic device may output the first execution screen corresponding to the input as illustrated in FIG. 13C, and thereafter may generate a space, to which the second execution screen is to be output, in a changed first execution screen 1309.

The electronic device may output the screen such that the first execution screen changed by the input does not overlap with the second execution screen.

FIGS. 14A, 14B, 14C and 14D illustrate a screen control operation of an electronic device according to various exemplary embodiments of the present disclosure.

Referring to FIGS. 14A, 14B, 14C and 14D, the electronic device may output a second execution screen in a state where a first execution screen is output. The electronic device may output the screen such that a content of the first execution screen is not hidden by the second execution screen. For example, if a video playback screen is output onto a web search screen, the electronic device may separate the web search screen and may output the video playback screen between the separated screens.

The electronic device may output a third execution screen by detecting an input.

Figure 14:
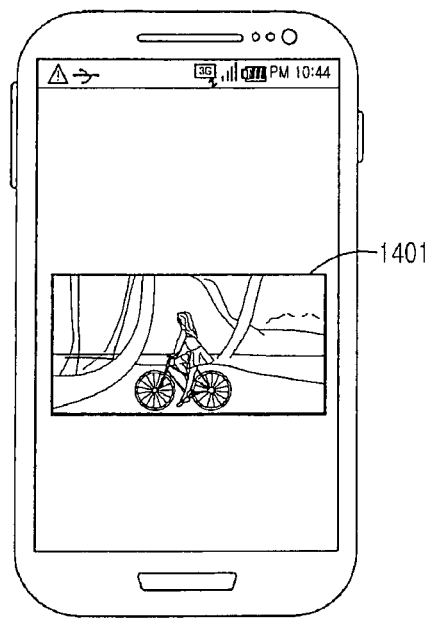
FIGS. 14A, 14B, 14C and 14D illustrate a screen control operation of an electronic device according to various exemplary embodiments of the present disclosure.
Figure 14:
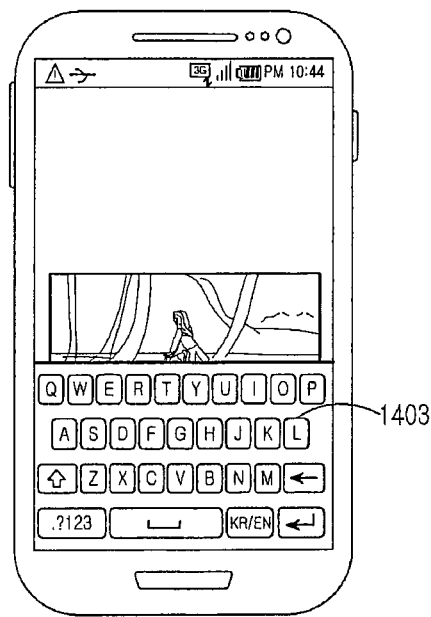
Figure 14:
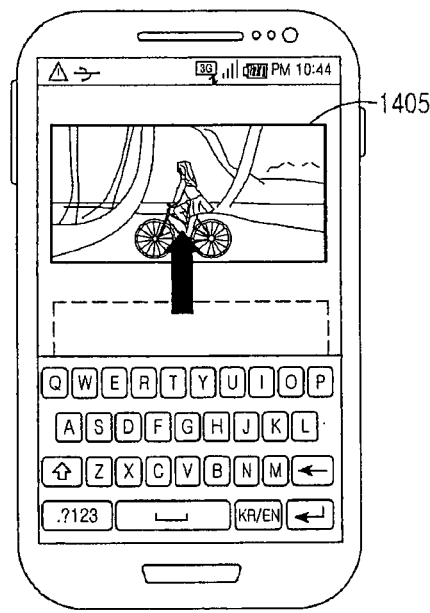
Figure 14:
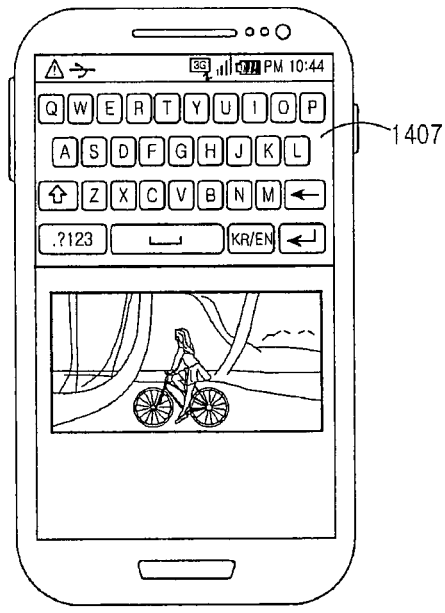

Upon detection of an input for outputting the third execution screen (i.e., keyboard screen) in a state where a first execution screen (i.e., background screen) and a second execution screen (i.e., backup screen) 1401 are output as illustrated in FIG. 14A, the electronic device may output a third execution screen 1403 corresponding to the input as illustrate din FIG. 14B. The electronic device may output the screen such that the second execution screen 1401 is not hidden by the third execution screen 1403.

For example, if the second execution screen is hidden by the third execution screen as illustrated in FIG. 14C, the electronic device may move the previously output second execution screen 1401 to an area not overlapping with the third execution screen 1403 (see 1405).

For another example, if the second execution screen 1401 is hidden by the third execution screen 1403 as illustrated in FIG. 14D, the electronic device may output the third execution screen 1403 to an area not overlapping with the second execution screen 1401 (seep 1407).

FIGS. 15A, 15B, 15C and 15D illustrate a screen control operation of an electronic device according to various exemplary embodiments of the present disclosure.

Referring to FIGS. 15A, 15B, 15C and 15D, the electronic device may output a second execution screen in a state where a first execution screen is output. The electronic device may output the screen such that a content of the first execution screen is not hidden by the second execution screen. For example, if a video playback screen is output onto an image playback screen, the electronic device may separate the image playback screen and may output the video playback screen between the separated screens.

The electronic device may change a configuration of the first execution screen and output the second execution screen which is output according to an input by using the changed configuration of the first execution screen.

For example, as illustrated in FIGS. 15A, 15B, 15C and 15D, the electronic device may output a second execution screen 1503 to an upper end or lower end of a first execution screen 1501, or may separate the first execution screen into an upper side 1501-1 and a lower side 1501-2 and add the second execution screen between the separated screens.

For another example, the electronic device may output a second execution screen 1513 to a left side or right side of a first execution screen 1511, or may separate the first execution screen into a left side 1511-1 and a right side 1511-2 and add the second execution screen between the separated screens.

FIGS. 16A, 16B, 16C and 16D illustrate a screen control operation of an electronic device according to various exemplary embodiments of the present disclosure.

Referring to FIGS. 16A, 16B, 16C and 16D, the electronic device may output a second execution screen in a state where a first execution screen is output. The electronic device may output the screen such that a content of the first execution screen is not hidden by the second execution screen.

The electronic device according to various exemplary embodiments of the present disclosure may change a configuration of the first execution screen, for example, may separate the first execution screen and add the second execution screen between the separated screens. For example, the electronic device may separate a web search screen and output a video playback screen between the separated screens. In addition to the web search screen and the video playback screen, the electronic device may apply the exemplary embodiments of the present disclosure to other execution screens.

Figure 16:
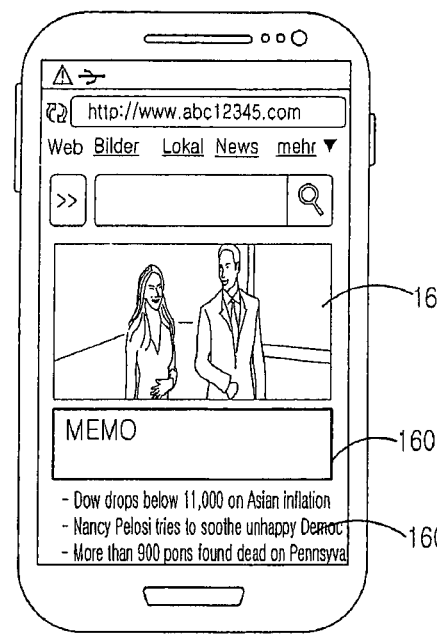
FIGS. 16A, 16B, 16C and 16D illustrate a screen control operation of an electronic device according to various exemplary embodiments of the present disclosure.
Figure 16:
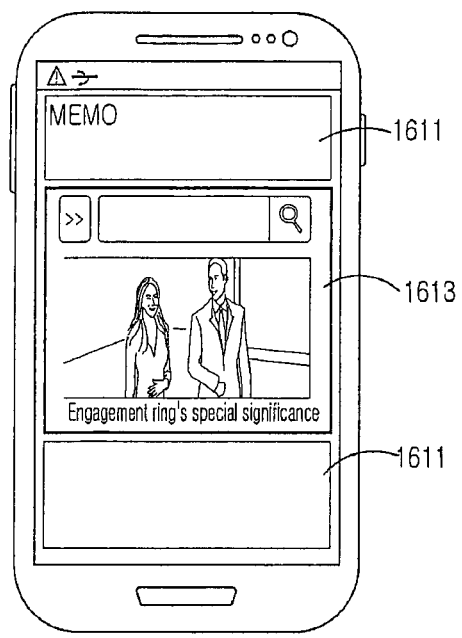
Figure 16:
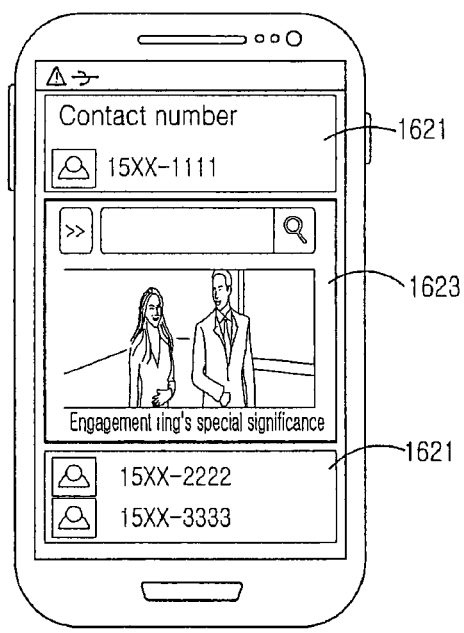
Figure 16:
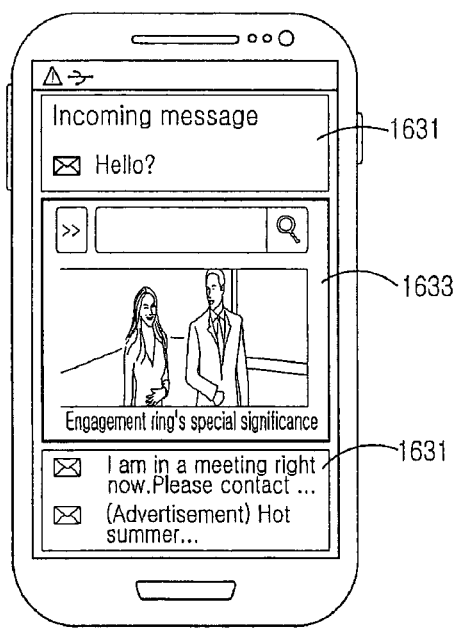

For another example, the electronic device may separate a web search screen 1601 as illustrated in FIG. 16A, and may output a memo screen 1603 between the separated web search screens.

For another example, the electronic device may separate a memo screen 1611 as illustrated in FIG. 16B, and may output a web search screen 1613 between the separated memo screens.

For another example, the electronic device may separate a contact number search screen 1621 as illustrated in FIG.

16C, and may output a web search screen 1623 to the separated contact number search screens.

For another example, the electronic device may separate an incoming message screen 1631 as illustrated in FIG. 16D, and may output a web search screen 1633 between the separated incoming message screens.

Figure 17:
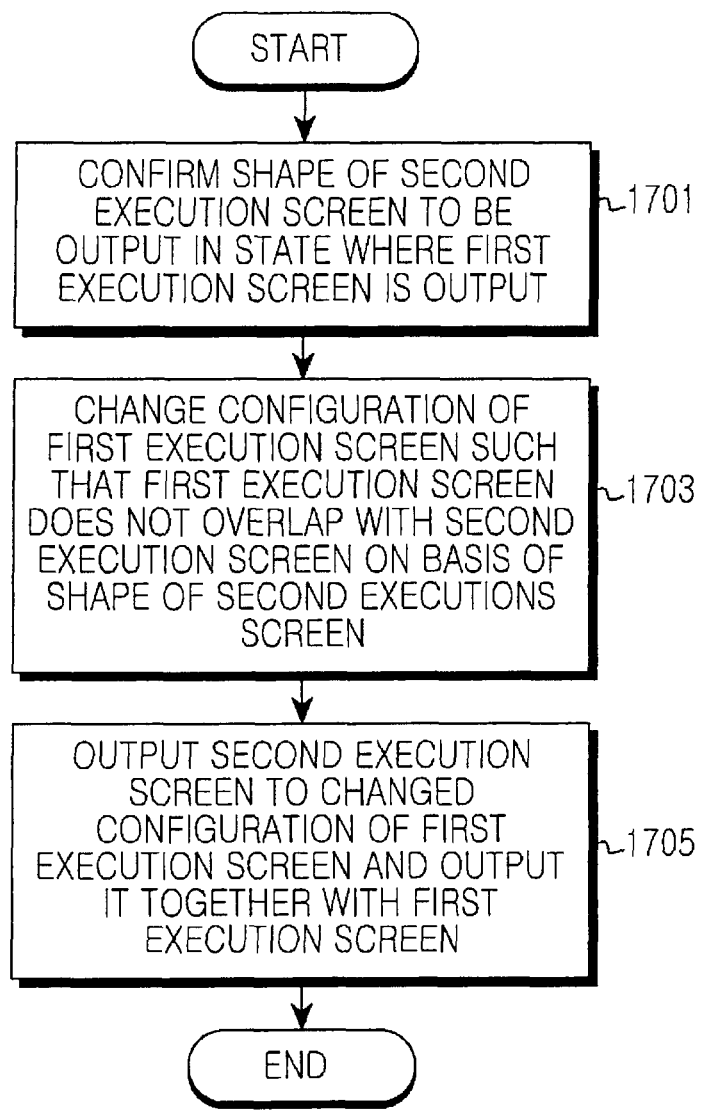
FIG. 17 is a flowchart illustrating a screen output operation of an electronic device according to various exemplary embodiments of the present disclosure.

FIG. 17 is a flowchart illustrating a screen output operation of an electronic device according to various exemplary embodiments of the present disclosure.

Referring to FIG. 17, the electronic device may confirm a shape of a second execution screen to be output in a state where a first execution screen is output in step 1701.

For example, the electronic device may confirm a height, size, location, direction, etc., of the second execution screen to be executed.

In step 1703, the electronic device may change a configuration of the first execution screen such that the first execution screen does not overlap with the second execution screen, on the basis of the shape of the second executions screen.

For example, the electronic device may generate a space for outputting the second execution screen by separating the first execution screen. The electronic device may divide the first execution screen into a plurality of areas on the basis of the space or may generate a plurality of output areas on the basis of the space.

In step 1705, the electronic device may place the second execution screen to the changed configuration of the first execution screen and output it together with the first execution screen.

Each of the aforementioned constitutional elements of the electronic device of according to the present disclosure may consist of one or more components, and names thereof may vary depending on a type of electronic device. The electronic device according to the present disclosure may include at least one of the aforementioned constitutional elements. Some of the constitutional elements may be omitted, or additional other constitutional elements may be further included. In addition, some of the constitutional elements of the electronic device according to the present disclosure may be combined and constructed to one entity, so as to equally perform functions of corresponding constitutional elements before combination.

A term used as a constitutional element in the present disclosure, for example, a "module", may imply a unit including, for example, one of hardware, software, and firmware or a combination of two or more of them. The "module" may be interchangeably used with a term such as a unit, a logic, a logical block, a component, a circuit, etc. The "module" may be a minimum unit of an integrally constituted component or may be a part thereof. The "module" may be a minimum unit for performing one or more functions or may be a part thereof. The "module" may be mechanically or electrically implemented. For example, the "module" of the present disclosure may include at least one of an Application-Specific Integrated Circuit (ASIC) chip, a field-programmable gate arrays (FPGAs), and a programmable-logic device, which are known or will be developed and which perform certain operations.

According to various exemplary embodiments, at least some parts of a device (e.g., modules or functions thereof) or method (e.g., operations) of the present disclosure may be implemented with an instruction stored in a computer-readable storage media for example. If the instruction is executed by one or more processors, the one or more processors may perform a function corresponding to the instruction. The computer-readable storage media may be a memory for example. At least some parts of the programming module may be implemented (e.g., executed) by the processor. At least some parts of the programming module may include modules, programs, routines, sets of instructions, processes, etc., for performing one or more functions.

The computer readable recording medium may be a hardware device configured particularly to store and perform a program instruction (e.g., program module), for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, etc. An example of the program instruction includes not only a machine language created by a compiler but also a high-level language executable by a computer by using an interpreter or the like. The aforementioned hardware device may be configured to operate as one or more software modules to perform the operation of the present disclosure, and the other way around is also possible.

The module or programming module according to the present disclosure may further include at least one or more constitutional elements among the aforementioned constitutional elements, or may omit some of them, or may further include additional other constitutional elements. Operations performed by a module, programming module, or other constitutional elements of the present disclosure may be executed in a sequential, parallel, repetitive, or heuristic manner. In addition, some of the operations may be executed in a different order or may be omitted, or other operations may be added.

According to various exemplary embodiment, a storage medium having instructions stored therein is provided. The instructions are performed by at least one processor and allow the at least one processor to perform at least one operation. The at least one operation includes confirming a shape of a second execution screen to be output in a state where a first execution screen is output, changing a configuration of the first execution screen such that the first execution screen and the second execution screen do not overlap with each other, on the basis of the shape of the second execution screen, and placing the second execution screen to the changed configuration of the first execution screen and outputting the screen together with the first execution screen.

According to various exemplary embodiments, an electronic device can improve application execution performance by outputting a second execution screen such that the screen does not hide a first execution screen.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device, comprising:
 a display; and
 a processor, configured to:
  display, on the display, a first execution screen of a first application and a second execution screen of a second application;
  detect an input requesting arrangement of the first execution screen and the second execution screen;

arrange the first execution screen and the second execution screen based on a shape of the second execution screen by dividing the first execution screen into a first display area and a second display area, and interposing the second execution screen between the first and second display areas, such that the first execution screen and the second execution screen do not overlap one other; and display a scroll icon that is movable along a scroll region disposed adjacent to the first display area, the interposed second execution screen, and the second display area, wherein the scroll icon is selectable movable to scroll contents displayed in the first display area and second display area but exclude from scrolling content of the second execution screen, the scrolling including removing a particular content from the first display area and adding the particular content to the second display area when scrolling of the particular content reaches a boundary within the first display area; and in response to detecting a drag input to the interposed second execution screen:

when the drag input moves upwards and is detected at a top border of the interposed second execution screen, enlarging the interposed second execution screen according to the drag input, and when the drag input is released, rearranging the first and second display areas of the first execution screen such that the rearranged first and second display areas do not overlap with the enlarged interposed second execution screen; and when the drag input moves upwards and is detected at a bottom border of the interposed second execution screen, moving an entirety of the second execution screen according to the drag input.

2. The electronic device of claim 1, wherein the first display area and the second display area are displayed to a first window and a second window, respectively.

3. The electronic device of claim 1, wherein if a size or location of the second execution screen is changed, the processor changes a shape of the first execution screen according to a change in the size or the location of the second execution screen.

4. The electronic device of claim 1, wherein the processor is further configured to: in response to detecting a selection and drag of the second execution screen over a portion of the first execution screen indicating a new location for the second execution screen, alter sizes of the first and second display areas and moving content from the first display area to the second display area based on the altered sizes.

5. A method in an electronic device, the method comprising:

displaying, on a display, a first execution screen of a first application and a second execution screen of a second application;

detecting an input requesting rearrangement of the first execution screen and the second execution screen;

in response to the detected input, changing a configuration of the first execution screen such that the first execution screen and the second execution screen do not overlap with each other, based on a detected shape of the second execution screen, wherein the changed configuration of the first execution screen includes dividing the first execution screen into a first display area and a second display area, and interposing the second execution screen between the first and second display areas so that the second execution screen is displayed with the first execution screen; and displaying a scroll icon that is movable along a scroll region disposed adjacent to the first display area, the interposed second execution screen, and the second display area, wherein the scroll icon is selectable movable to scroll contents displayed in the first display area and second display area but exclude from scrolling content of the second execution screen, the scrolling including removing a particular content from the first display area and adding the particular content to the second display area when scrolling of the particular content reaches a boundary within the first display area; and in response to detecting a drag input to the interposed second execution screen:

when the drag input moves upwards and is detected at a top border of the interposed second execution screen, enlarging the interposed second execution screen according to the drag input, and when the drag input is released, rearranging the first and second display areas of the first execution screen such that the rearranged first and second display areas do not overlap with the enlarged interposed second execution screen; and when the drag input moves upwards and is detected at a bottom border of the interposed second execution screen, moving an entirety of the second execution screen according to the drag input.

6. The method of claim 5, further comprising providing control in one screen together with the first execution screen according to an input.

7. The method of claim 5, further comprising, if a third execution screen is output onto the second execution screen which is output to the changed configuration of the first execution screen, outputting the first execution screen such that the second execution screen and the third execution screen do not overlap with each other.

8. The method of claim 7, wherein the outputting of the first execution screen such that the second execution screen and the third execution screen do not overlap with each other includes moving the second execution screen to a location not overlapping with the third execution screen or outputting the third execution screen to a location not overlapping with the second execution screen.

9. The method of claim 5, wherein in the first execution screen having the changed configuration, an area other than an area to which the second execution screen is placed consists of a plurality of windows.

10. The method of claim 5, wherein the first execution screen having the changed configuration consists of one window.

11. The method of claim 5, further comprising: in response to detecting a selection and drag of the second execution screen over a portion of the first execution screen indicating a new location for the second execution screen, altering sizes of the first and second display areas and moving content from the first display area to the second display area based on the altered sizes.

* * * * *